United States Patent [19]

Sanders et al.

[11] 4,307,144

[45] Dec. 22, 1981

[54] STATIC-DISSIPATING FABRICS

[75] Inventors: John H. Sanders, Newport News; Galen E. Chambers; James A. Gusack, both of Williamsburg, all of Va.

[73] Assignee: Badische Corporation, Williamsburg, Va.

[21] Appl. No.: 912,673

[22] Filed: Jun. 5, 1978

Related U.S. Application Data

[63] Continuation-in-part of Ser. No. 815,396, Jul. 13, 1977, abandoned.

[51] Int. Cl.³ .............................................. B32B 5/16
[52] U.S. Cl. .................................... 428/240; 428/242; 428/244; 428/252; 428/265; 428/283; 428/286; 428/290; 428/423.1; 428/424.2; 428/522; 428/922
[58] Field of Search ................ 428/95, 96, 97, 245, 428/240, 242, 244, 252, 265, 283, 286, 290, 423.1, 424.2, 522, 922

[56] References Cited

U.S. PATENT DOCUMENTS 3,196,315 7/1965 Peterson .............................. 428/95
3,582,445 6/1971 Okuhashi ............................ 428/95

*Primary Examiner*—Marion McCamish
*Attorney, Agent, or Firm*—G. F. Helfrich

[57] ABSTRACT

Static-dissipating fabric constructions especially suitable as upholstery material comprise a dielectric wear surface, which is a durable film or sheet of polymeric material such as polyvinyl chloride or polyurethane, and a conductive substratum securely bonded to the underside of the wear surface. The substratum has a surface resistance of $10^9$ ohms/square or less.

6 Claims, 5 Drawing Figures

STATIC-DISSIPATING FABRICS

CROSS REFERENCE

This application is a continuation-in-part of our co-pending application Ser. No. 815,396, which was filed on July 13, 1977 and is now abandoned.

BACKGROUND OF THE INVENTION

1. Field of the Invention

This invention relates generally to fabric constructions. It relates in particular to static-dissipating fabrics which are constructed from a non-conducting polymeric web and a conductive substratum bonded thereto.

2. Prior Art Statement

The accumulation of static electricity as a result of the utilization of fabrics is a phenomenon which has commanded the attention of many industries for quite some time. This is easily understood as the presence of static is a cause of considerable annoyance—e.g., items of apparel cling to the body and are attracted to other garments; fine particles of lint and dust are attracted to upholstery and carpet fabrics, increasing the frequency of required cleaning; one experiences a jolt or shock upon touching a metallic object or another person after walking across a carpet or sliding across an upholstered seat. All of these effects are concentrated in atmospheres of low relative humidity.

Of the many existing proposals for preventing the undesirable buildup of static electricity, the most satisfactory, with respect to their efficiency and permanence, appear to be those which comprehend the utilization of fabric constructions wherein some durable electrically-conductive elements (e.g., metal fibers, textile fibers coated with an adhesive matrix comprising electrically-conductive material, or metallic laminate filaments) are present in the fabric, viz., in the face or wear surface of the fabric—i.e., such electrically-conductive elements are positioned so that direct contact thereof with the person is effected as the fabric is utilized. Some of the more noteworthy of these structures are described in U.S. Pat. Nos. 3,678,675; 3,823,035; 3,586,597; 3,706,195; 3,708,335; 3,288,175; 2,302,003; 3,746,573; 3,806,401; 3,836,422; 3,861,429; and 3,955,022; in Belgian Pat. No. 790,254; in Japanese Utility Model, Sho 42-21017; and in Webber, "Metal Fibers," *Modern Textiles Magazine,* May, 1966, pp. 72–75, among many others.

Notwithstanding the efficacy of these and similar structures, they are all found lacking in one very important aspect, viz., the choice of face or wear surfaces is limited to those materials and structures which can contain the durable electrically-conductive element(s) without substantial adverse effects upon the structural integrity, appearance, and utility thereof—i.e., highly durable face or wear surfaces consisting of dielectric films or sheets of polymeric material such as polyvinyl chloride and polyurethane are excluded. In this regard, the teachings of Webber (U.S. Pat. No. 3,288,175); Cadwell (U.S. Pat. No. 2,302,003); Brinkhoff, et al. (U.S. Pat. No. 3,806,401); and Bischoff (U.S. Pat. No. 3,836,422) are to be especially noted. In view of today's requirements for enhanced product efficiency, durability, and versatility, without any excessive corresponding increases in product costs, such a limitation on the choice of face or wear surfaces is completely undesirable.

References of particular pertinence are set forth below:

1. U.S. Pat. No. 3,042,737 and U.S. Pat. No. 3,582,445 teach the employment of electrically-conductive elements, esp. metal-coated filaments and carbon-coated filaments, respectively, in the wear surface of fabrics having an "open" structure (i.e., pile fabrics such as carpets). Highly durable "closed" wear surfaces such as integral films or sheets of polymeric material, esp. polyvinyl chloride and polyurethane, are not disclosed or suggested. Moreover, the electrically-conductive elements are positioned so that direct contact thereof with the person is effected as the fabrics are utilized (viz, the disclosure and teachings require that conductive elements must be present in the fabric face, not in the backing.)

2. U.S. Pat. No. 3,196,315 discloses a carpet comprising a wear surface and a backing or underlay formed from semiconductive, resilient or sponge-like material having a volume resistivity in the range of $10^3$–$10^7$ ohms.cm. The comprehended wear surface is an "open" structure, (cf. (1) above), and the underlay in its preferred embodiment is a sponge rubber or like structure having electrically-conductive carbon particles dispersed therein. Employing the teachings of this reference, an 18 oz./yd$^2$ cut pile carpet was constructed from bulked continuous filament nylon 6 carpet yarn comprising 136 individual strands and having a total denier of 2600. This nylon carpet yarn was tufted into an underlay comprising woven polypropylene having 1 gm/yd$^2$ of the electrically-conductive fiber described and claimed in U.S. Pat. No. 3,823,035, the underlay having a volume resistivity within the range $10^3$–$10^7$ ohms.cm. The static level of this carpet was determined by standard means (see, e.g., the "Static Electricity Test" described in U.S. Pat. No. 3,823,035 in Col. 8 at line 17 ff.) and was found to be 6.5 kilovolts. Although this value represents an improvement over similar nylon carpets having no conductive underlay (which carpets provide static levels of 12 to 13 kilovolts), static was not reduced below the threshold level of human sensitivity (which is universally accepted as 2.5 to 3.5 kilovolts, as in well known to those of skill in the art). As a consequence, it is clear that U.S. Pat. No. 3,196,315 does not teach one of skill in the art how to prepare static-dissipating fabric constructions which are capable of preventing the buildup of static to levels exceeding the threshold level of human sensitivity.

SUMMARY OF THE INVENTION

The primary object of the present invention was to provide a highly efficient, low cost static-dissipating fabric which would utilize a very durable wear surface, thereby affording a versatile construction which would find application in a wide variety of end uses, not the least important of which is as an upholstery fabric; it was considered essential that the fabric be capable of preventing the buildup of static to levels exceeding the threshold level of human sensitivity, so that no shock would be experienced after walking across a floor or sliding across a seat covered with the fabric. This object was achieved, the disadvantages of the prior art being obviated, by providing a fabric construction which comprises a dielectric wear surface comprising a durable film or sheet of polymeric material and a conductive substratum securely bonded to the underside of the wear surface, the substratum having a surface resistance of $10^9$ ohms/square or less.

Special advantages are achieved—vis, the wear surface is especially durable—when the wear surface is a web of polymeric material selected from the group consisting of polyvinyl chloride and polyurethane.

Highly efficacious and useful embodiments of the invention are provided when the conductive substratum is:

1. A scrim comprising a knitted, woven, or non-woven textile fabric incorporating a conductive element selected from the group consisting of metallic filaments and conductive textile filaments; or
2. A coating comprising electrically-conductive particles in an adhesive matrix; or
3. A foamed polymeric material incorporating a conductive element selected from the group consisting of conductive particles, metallic filaments, and conductive textile filaments dispersed throughout said foamed polymeric material, which includes a backing layer in coextensive union therewith for providing dimensional stability thereto; or
4. A composite structure comprising
   (a) an inner layer in coextensive union with the wear surface, the inner layer comprising a resilient web of plasticized polymeric material; and
   (b) an electrically-conductive backing layer in coextensive union with the inner layer for providing dimensional stability and static-dissipating properties to the construction.

Contrary to numerous teachings of the prior art—and consequently surprising in view thereof—the fabric constructions of the present invention are in fact static-dissipating, and accordingly provide an outstanding accomplishment which stands out against the background of the prior art as a very valuable improvement. That the fabric constructions of the present invention are capable of preventing the buildup of static to levels exceeding the threshold level of human sensitivity is completely unexpected, especially in view of the results of employing fabric constructions as disclosed in U.S. Pat. No. 3,196,315.

BRIEF DESCRIPTION OF THE DRAWING

For a more complete understanding of the present invention, including its primary object and benefits, reference should be made to the detailed description of the preferred embodiments thereof, which is set forth below. This detailed description should be read together with the accompanying schematic drawings, wherein.

DETAILED DESCRIPTION OF THE PREFERRED EMBODIMENTS

Figure 1:
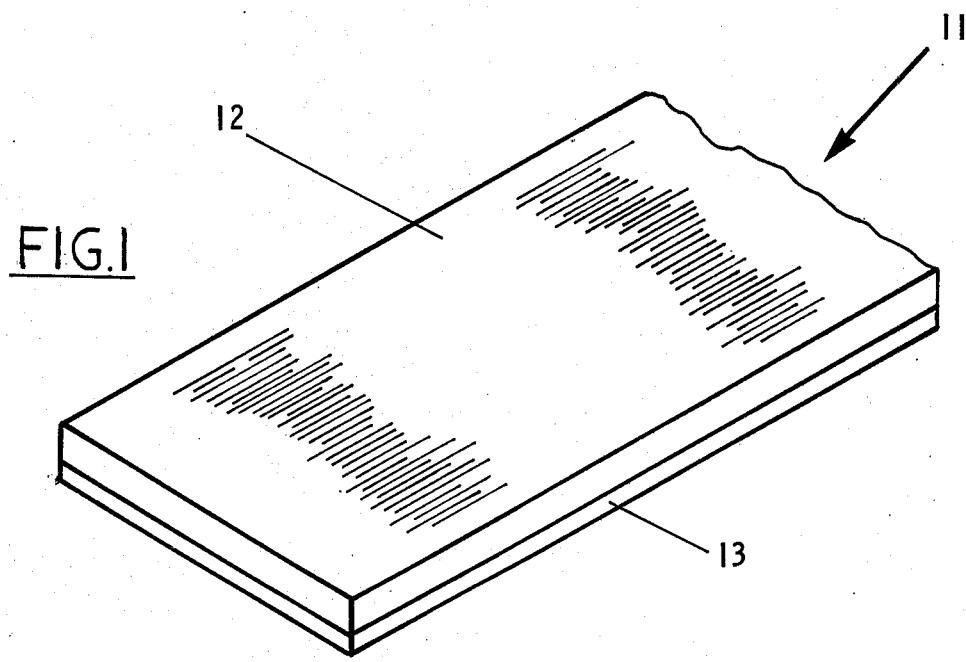
FIG. 1 is a perspective view of a fabric construction (11) according to the present invention, showing the essential components thereof.

Referring now to the drawing, there is shown in FIG. 1 a static-dissipating fabric construction (11) according to the present invention. Construction (11) comprises a face or wear surface (12) and a substratum (13) securely bonded to the underside of wear surface (12). Wear surface (12) is a durable web—i.e., a durable film or sheet—of polymeric material, esp. a non-conductive thermoplastic polymer such as polyvinyl chloride or polyurethane, both of which are commonly employed in the industry as wear surfaces for fabrics such as those used in upholstery. Such a web (12) may be provided as an already existing integral layer, or it may be provided as a coherent unitary coating, which has been applied to substratum (13) by any of a number of basic methods well known and commonly employed in the art. Such methods include direct solution coating and transfer coating; as well as melt coating methods such as calendering, extrusion, and film lamination. Polyvinyl chloride and polyurethane are especially advantageously employed, because of their outstanding processability in these methods, as well as their distinctive physical properties which include excellent flexibility, very good resistance to abrasion and general solvent attack, and very good weatherability. It is to be understood that wear surface (12) is not limited to any particular functional or esthetic characteristic such as a high degree of porosity, a particular ornamental design, or the like. That is to say, although conformations such as poromeric structures may be advantageous employed because of the resulting "breathability" of the fabric, such structures are by no means essential to the operation of the present invention.

Figure 2:
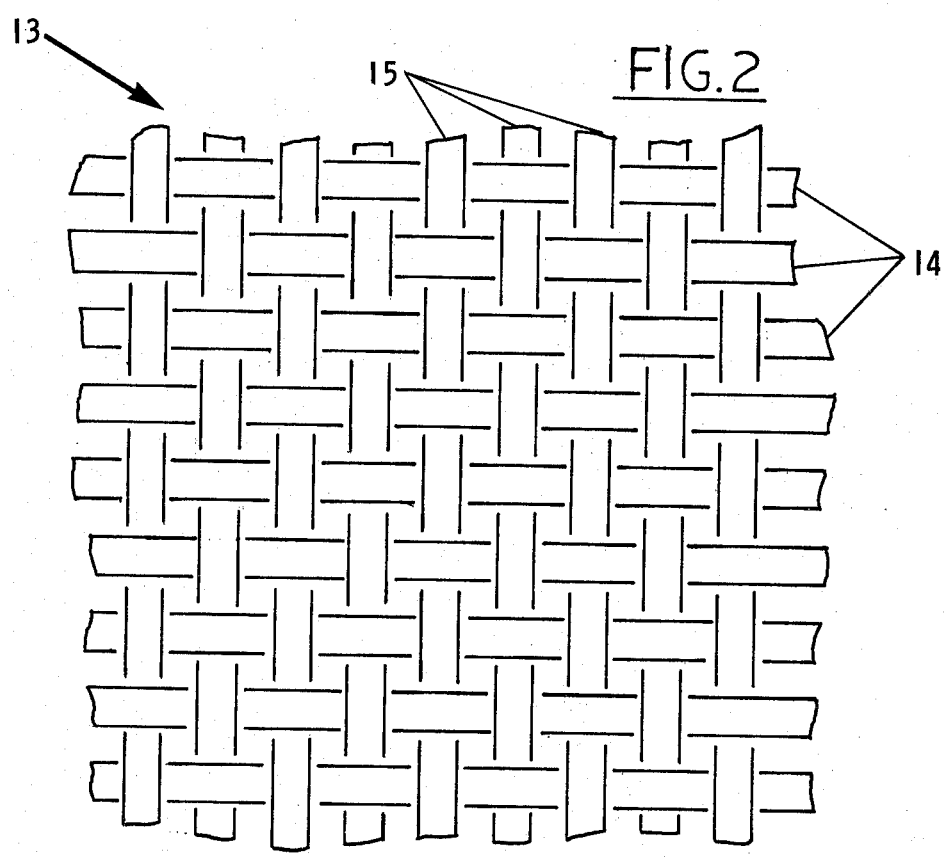
FIG. 2 is a plan view of a useful substratum (13) which is an integral component of the fabric construction of FIG. 1.

As is seen in FIG. 1, conductive substratum (13) is securely bonded to the underside of wear surface (12). Satisfactory substrata (13) which have been employed with beneficial results are those having a surface resistance of $10^9$ ohms/square or less, which include those depicted in FIGS. 2–5. FIG. 2 illustrates a very satisfactory substratum (13), which is a scrim comprising a knitted, woven, or non-woven textile fabric (a woven fabric is actually shown) incorporating conductive elements (14) interwoven with ordinary threads (15), which are made from natural fibers such as cotton, and/or man-made fibers such as nylon, acrylic, polyester, polyolefin or rayon. Conductive elements (14) are advantageously metallic filaments or conductive textile filaments, examples of which are found in the following U.S. Pat. Nos. 3,379,000; 3,839,135; 3,823,035; and 3,708,335. The conductive elements (14) are advantageously present in an amount equal to about 1.0–100 percent by weight of the scrim, and preferably between about 0.5–10 percent by weight, depending upon the exact nature and conductivity of the particular conductive elements (14) chosen. In any event, the substratum will have a surface resistance of $10^9$ ohms/square or less.

Figure 3:
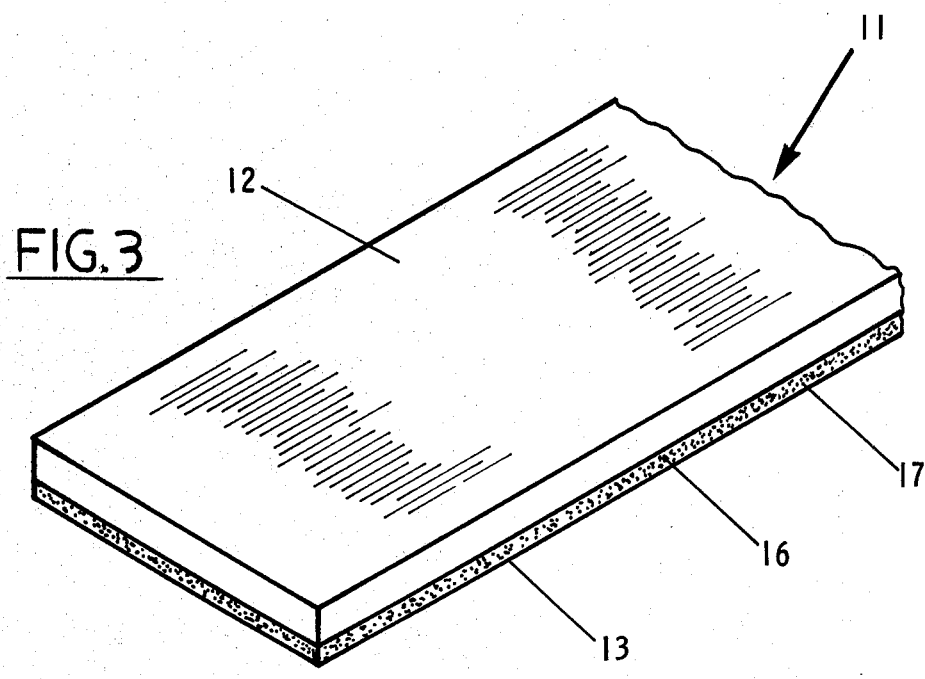
FIG. 3 is a perspective view of a fabric construction according to the present invention depicting another useful substratum (13)

FIG. 3 represents another very satisfactory substratum (13), which has also been employed with beneficial results. This substratum (13) is a coating which comprises electrically-conductive particles (16) in an adhesive matrix (17). Conductive particles which are employed with success include powdered silver, nickel, and copper sulfide; and most advantageously, electrically conductive carbon black having a particle size of about 30 mμ. The adhesive matrix (17) is conveniently a mixture of an acrylonitrile/butadiene copolymer and a phenolic resin or another similar composition readily available commercially. This coating (13) is continuous, interrupted at regular or irregular intervals, or in the form of a grid. Particularly good results are achieved if a mixture comprising 50 percent by weight of a 5/95 vinyl acetate—isopropyl alcohol solution having 50 percent by weight of carbon black (30 m$\mu$) dispersed therein is painted into the underside of an unsupported sheet of polyvinyl chloride at a dry weight add on of about 10–30 grams/yd$^2$. Under such conditions the surface resistance of structure (11) is about $4 \times 10^{10}$ ohms/sq., as compared with about $5 \times 10^{13}$ ohms/sq. for the unsupported sheet of polyvinyl chloride having no conductive substratum bonded thereto.

Figure 4:
FIG. 4 is a cross-sectional view of a fabric construction according to the present invention depicting yet another useful substratum (13)

FIG. 4 illustrates yet another very satisfactory substratum (13), which is also employed with beneficial results. This substratum (13) comprises a foamed polymeric material (18) which has dispersed therein one or more conductive elements selected from (a) conductive particles (e.g., powdered silver, nickel, copper sulfide, or most advantageously, electrically-conductive carbon black); (b) metallic filaments (see, e.g. U.S. Pat. Nos. 3,823,035; 3,586,597; and 3,706,195); and (c) conductive textile filaments (see, e.g., U.S. Pat. Nos. 3,823,035; 3,586,597; and 3,706,195). Such a foamed polymeric material (18) is advantageously composed of polyurethane or a polyamide such as nylon and the dispersion of conductive elements therethrough is conveniently accomplished by means of a process such as that described in either U.S. Pat. No. 3,981,654 or U.S. Pat. No. 3,980,484. In coextensive union with the layer (18) of foamed polymeric material incorporating a conductive element is a backing layer (19) for providing dimensional stability to the foamed layer (18), and in turn, to the composite construction (11). Conveniently employed as backing layer (19) is a common scrim, viz, a standard, open mesh, plain-weave cloth made from carded or combed yarns of either natural or man-made fibers or continuous filaments. Foamed layer (18) is bonded on one surface thereof to wear surface (12) and on the other surface thereof to backing layer (19) by standard means such as adhesive lamination—viz, an adhesive coating is applied to both surfaces of foamed layer (18), after which wear surface (12) and backing layer (19) are applied thereto with the aid of heat and pressure, as by passing the composite structure through the nip of 2 polytetrafluoroethylene-coated, heated rolls.

Figure 5:
FIG. 5 is a cross-sectional view of a fabric construction according to the present invention illustrating still another useful substratum (13).

Shown in FIG. 5 is still another very satisfactory substratum (13), which has also been employed with very beneficial results. This substratum (13) comprises inner layer (20), which is a resilient web of plasticized polymeric material (such as polyvinyl chloride or a vinyl chloride-vinyl acetate copolymer plasticized with tricresyl phosphate, dibutyl phthalate, or dioctyl phthalate in an amount sufficient to provide about 10–30 percent by weight; these and like plasticizers are usually added to the vinyl or other polymer on a hot roll or in a hot mixer such as a Banbury; stabilizers and fillers may also be added at the same time, as is well known to those of skill in the art). Inner layer (20) is in coextensive union on one surface thereof with wear surface (12). Such union is advantageously provided by adhesive bonding, among many satisfactory methods well known in the art. In coextensive union with the other surface of inner layer (20) is electrically-conducting backing layer (21), which provides static-dissipating properties and dimensional stability to substratum (13), and thereby to construction (11). Backing layer (21) is conveniently a conductive scrim comprising either (a) a standard, open mesh, plain weave cloth made from carded or combed yarns or continuous filaments; e.g., of man-made fibers interwoven with metallic filaments and/or conductive textile filaments, as in the substratum (13) depicted in FIG. 2; or (b) a standard, open mesh, plain weave cloth made from carded or combed yarns of either natural or man-made fibers, to which is applied a coating comprising conductive particles in an adhesive matrix, as is described in detail supra with reference to the substratum (13) of FIG. 3.

EXAMPLES

To further illustrate and specify the present invention for those of skill in the art, the following detailed examples are presented:

1. An unsupported sheet of polyvinyl chloride having a thickness of about 30 mils was bonded by calendering to a substratum comprising a 28 cotton count acrylic spun yarn scrim having a weight of about 4.8 oz./yd$^2$ and containing approximately 1 gram/yd$^2$ of the conductive filament disclosed in the Example 3, of U.S. Pat. No. 3,823,035. (Reference should be made to FIGS. 1 and 2 of the instant drawing.) The surface resistance of the scrim was $10^9$ ohms/square. The face surface resistance of the resulting fabric construction was about $2 \times 10^{10}$ ohms/sq., as compared with about $5 \times 10^{13}$ ohms/sq., for the unsupported sheet of polyvinyl chloride having no conductive substratum bonded thereto.

2. Several fabric constructions were prepared as in Example 1 above, the significant details of which are shown in Table 1 below. All substrated employed had a surface resistance of $10^9$ ohms/sq. or less. Each construction was individually subjected to the following test procedure, the results of which are tabulated in Table 1. In each test, an operator wearing wool trousers and holding a probe connected to a recording electrostatic voltmeter sits on the test fabric, which is fastened to a bench electrically insulated from the ground in a room kept as 70° F. and 20 percent relative humidity. The operator slides over the test fabric 3 times, after which the operator stands up and touches a coulomb meter, thereby recording the charge transferred to ground and whether or not a physiologically noticable shock is detected. An instantaneous charge transfer of about $4 \times 10^{-7}$ coulombs or less is ordinarily unnoticeable. The test is repeated 3 times and the results are averaged.

TABLE 1

| Sample No. | Wear Surface | Conductive Substratum | Maximum Kilovolts | Coulombs | Face Resistance Ohms/sq. | Noticeable Shock |
|---|---|---|---|---|---|---|
| 1 (This invention) | Polyvinyl chloride 30 mils thick | Acrylic scrim as in Example 1, containing 4 ends/ inch of conductive filament of U.S. | 1.6* | $3.5 \times 10^{-7}$ | $1 \times 10^{10}$ | No |

TABLE 1-continued

| Sample No. | Wear Surface | Conductive Substratum | Maximum Kilovolts | Coulombs | Face Resistance Ohms/sq. | Noticeable Shock |
|---|---|---|---|---|---|---|
| 2 (This invention) | Polyvinyl chloride 30 mils thick | Pat. No. 3,823,035 Acrylic scrim as in Example 1, containing 2 ends/ inch of conductive filament of U.S. Pat. No. 3,823,035 | 2.0* | $4.0 \times 10^{-7}$ | $2 \times 10^{10}$ | No |
| 3 (Not this invention) | Polyvinyl chloride 30 mils thick | None | 5.5** | $11.0 \times 10^{-7}$ | $5 \times 10^{13}$ | Yes |

*This value is below the threshold level of human sensitivity (2.5–3.5 kv).
**This value is above the threshold level of human sensitivity (2.5–3.5 kv).

One of the primary uses of the instant fabric construction is as an upholstery material for automobiles, airplanes, sofas, couches, etc. Other uses include floor coverings and fabric belts, among many others. That the instant fabric construction is so efficient in dissipating static is indeed surprising, as the durable face or wear surface by itself is an excellent dielectric.

The present invention has been pictured and specified in detail with respect to certain preferred embodiments thereof. However, as is understood by those of skill in the art, variations and modifications in this detail may be effected without any departure from the spirit and scope of the present invention, as defined in the hereto-appended claims.

What is claimed is:

1. A static-dissipating fabric construction capable of preventing the buildup of static to levels exceeding the threshold level of human sensitivity, which fabric construction comprises a durable, continuous, unitary film or sheet of polymeric material functioning as a wear surface, and a conductive substratum securely bonded to the underside of the wear surface, the substratum having a surface resistance of $10^9$ ohms/square or less.

2. The static dissipating construction of claim 1, wherein the polymeric material of the wear surface is selected from the group consisting of polyvinyl chloride and polyurethane.

3. The static-dissipating construction of claim 1, wherein the conductive substratum is a scrim comprising a knitted, woven, or non-woven textile fabric incorporating a conductive element selected from the group consisting of metallic filaments and conductive textile filaments.

4. The static-dissipating construction of claim 1, wherein the conductive substratum is a coating comprising conductive particles in an adhesive matrix.

5. The static-dissipating construction of claim 1, wherein the conductive substratum is a foamed polymeric material incorporating a conductive element selected from the group consisting of conductive particles, metallic filaments, and conductive textile filaments dispersed throughout said foamed polymeric material, which includes a backing layer in coextensive union therewith for providing dimensional stability thereto.

6. The static-dissipating construction of claim 1, wherein the conductive substratum comprises:
(a) an inner layer in coextensive union with the wear surface, the inner layer comprising a resilient web of plasticized polymeric material; and
(b) an electrically-conductive backing layer in coextensive union with the inner layer for providing dimensional stability and static-dissipating properties to the construction.

* * * * *